United States Patent
Whittle et al.

(10) Patent No.: US 11,073,039 B1
(45) Date of Patent: Jul. 27, 2021

(54) CERAMIC MATRIX COMPOSITE HEAT SHIELD FOR USE IN A TURBINE VANE AND A TURBINE SHROUD RING

(71) Applicants: Rolls-Royce plc, London (GB); Rolls-Royce High Temperature Composites Inc., Cypress, CA (US)

(72) Inventors: Michael J. Whittle, London (GB); Michael J. Abbott, Cypress, CA (US)

(73) Assignee: Rolls-Royce plc

( * ) Notice: Subject to any disclaimer, the term of this patent is extended or adjusted under 35 U.S.C. 154(b) by 26 days.

(21) Appl. No.: 16/752,175

(22) Filed: Jan. 24, 2020

(51) Int. Cl.
*F01D 9/04* (2006.01)
*F01D 11/08* (2006.01)
*F01D 25/24* (2006.01)
*F01D 5/28* (2006.01)

(52) U.S. Cl.
CPC ............ *F01D 11/08* (2013.01); *F01D 25/246* (2013.01); *F01D 5/284* (2013.01); *F01D 9/04* (2013.01); *F05D 2220/323* (2013.01); *F05D 2230/64* (2013.01); *F05D 2240/11* (2013.01); *F05D 2240/15* (2013.01); *F05D 2260/30* (2013.01); *F05D 2300/6033* (2013.01)

(58) Field of Classification Search
CPC ........ F01D 11/08; F01D 25/246; F01D 5/284; F01D 9/04; F05D 2240/323; F05D 2230/64; F05D 2240/11; F05D 2260/30; F05D 2300/6033
See application file for complete search history.

(56) References Cited

U.S. PATENT DOCUMENTS

| | | |
|---|---|---|
| 6,076,835 A | 6/2000 | Ress et al. |
| 6,340,285 B1 | 1/2002 | Gonyou et al. |
| 6,530,744 B2 | 3/2003 | Liotta et al. |
| 6,991,427 B2 | 1/2006 | Scott |
| 7,798,775 B2 | 9/2010 | Kammel et al. |
| 8,147,192 B2 | 4/2012 | Jones et al. |
| 8,814,507 B1 | 8/2014 | Campbell et al. |
| 9,546,557 B2 | 1/2017 | Grooms, III et al. |
| 9,797,262 B2 | 10/2017 | Richardson et al. |
| 9,915,159 B2 | 3/2018 | Huizenga et al. |
| 10,072,516 B2 | 9/2018 | Carr et al. |

(Continued)

FOREIGN PATENT DOCUMENTS

GB 1225445 A 3/1971

OTHER PUBLICATIONS

Extended European Search Report, European Application No. 21150170.5-1004, dated Feb. 25, 2021, 6 pages.

*Primary Examiner* — Woody A Lee, Jr.
*Assistant Examiner* — Maxime M Adjagbe
(74) *Attorney, Agent, or Firm* — Barnes & Thornburg LLP (57) ABSTRACT

A turbine section of a gas turbine engine includes a vane assembly that redirects hot gases in the turbine section, a turbine shroud that extends around a turbine wheel to keep the hot gases from avoiding interaction with the turbine wheel, and a heat shield that provides parts of the vane assembly and the turbine shroud. The heat shield comprises ceramic matrix composite materials and is formed as a one piece component. The heat shield includes a vane portion that protects other vane assembly parts, a seal segment portion that protects other turbine shroud parts, and a forward turn-up and an aft turn-up. The forward turn-up and the aft turn-up couple the heat shield to other parts of the turbine section.

20 Claims, 7 Drawing Sheets

(56) References Cited

U.S. PATENT DOCUMENTS

| | | |
|---|---|---|
| 10,253,641 B2 | 4/2019 | Shapiro et al. |
| 10,253,643 B2 | 4/2019 | Kerns et al. |
| 10,301,953 B2 | 5/2019 | Correia |
| 10,309,240 B2 | 6/2019 | Heitman et al. |
| 10,370,990 B2 | 8/2019 | Reynolds et al. |
| 10,385,709 B2 | 8/2019 | Reynolds et al. |
| 10,385,731 B2 | 8/2019 | Kerns et al. |
| 10,393,381 B2 | 8/2019 | Noe et al. |
| 2005/0031446 A1 | 2/2005 | Ress et al. |
| 2005/0158168 A1 | 7/2005 | Bruce et al. |
| 2016/0069199 A1 | 3/2016 | Duelm et al. |
| 2016/0177761 A1* | 6/2016 | Huizenga ............... F01D 25/162 |
| | | 415/209.3 |
| 2017/0051619 A1 | 2/2017 | Tuertscher |
| 2017/0107837 A1* | 4/2017 | Huizenga ............... F16J 15/061 |
| 2018/0016924 A1 | 1/2018 | Gallier et al. |
| 2018/0238183 A1* | 8/2018 | Reynolds .................. F23R 3/10 |
| 2019/0162072 A1 | 5/2019 | Parvis et al. |
| 2020/0200025 A1 | 6/2020 | Whittle et al. |

\* cited by examiner

CERAMIC MATRIX COMPOSITE HEAT SHIELD FOR USE IN A TURBINE VANE AND A TURBINE SHROUD RING

The present disclosure relates generally to turbine assemblies adapted for use in gas turbine engines, and more specifically to turbine assemblies that integrate ceramic matrix composite components.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength limitations of composite materials.

SUMMARY

The present disclosure may comprise one or more of the following features and combinations thereof.

A turbine section of a gas turbine engine may include a turbine case, a carrier segment, a vane assembly, a turbine wheel, a turbine shroud, and a heat shield. The carrier may include a main body, a forward shield mount, and an aft shield mount. The turbine shroud may include a turbine shroud portion of the carrier segment. The heat shield may comprise ceramic matrix composite materials and is included as part of the vane assembly and the turbine shroud.

In some embodiments, the turbine case may be shaped to surround a central axis of the turbine section.

In some embodiments, the carrier segment may comprise metallic materials and extend partway around the central axis. The main body may be coupled to the case, the forward shield mount may be arranged along a forward side of the main body, and the aft shield mount may be arranged along an aft side of the main body.

In some embodiments, the vane assembly may include a support spar comprising metallic materials. The support spar may be coupled to the main body of the carrier segment and extend radially inward from the main body of the carrier segment toward the central axis.

In some embodiments, the turbine wheel may include a disk mounted for rotation about the central axis and a plurality of blades coupled to the periphery of the disk for rotation therewith about the central axis.

In some embodiments, the turbine shroud may be located co-axially with and radially outward of the turbine wheel to block gases moving along the primary gas path from moving over the blades of the turbine wheel without interacting with the turbine blades.

In some embodiments, the heat shield may be formed as a one piece component that is shaped to include (i) a vane portion having an outer platform and an airfoil that protect the support spar of the vane assembly, (ii) a seal segment portion that protects the turbine shroud portion of the carrier segment so as to provide the vane assembly and the turbine shroud without a gap between the outer platform of the vane assembly and the turbine shroud, and (iii) a forward turn-up extending radially outward from a forward edge of the outer platform and an aft turn-up extending radially outward from an aft edge of the seal segment portion, the forward turn-up and the aft turn-up coupling the heat shield to the carrier segment.

In some embodiments, the forward shield mount may be rigidly attached to the forward side of the main body of the carrier segment. The aft shield mount may be rigidly attached to the aft side of the main body of the carrier segment.

In some embodiments, the forward turn-up may couple to the forward shield mount. The aft turn-up may couple to the aft shield mount.

In some embodiments, the forward shield mount may extend at least partway over a circumferential extent of the forward turn-up and the aft shield mount may extend at least partway over a circumferential extent of the aft turn-up. The forward shield mount may include a first forward wall and a first aft wall defining a forward shield mount trench that at least partially surrounds a forward tip portion of the forward turn-up when the forward turn-up is coupled to the forward shield mount. The aft shield mount may include a second forward wall and a second aft wall defining an aft shield mount trench that at least partially surrounds an aft tip portion of the aft turn-up when the aft turn-up is coupled to the aft shield mount. A first width of the forward shield mount trench in an axial direction of the gas turbine engine may be greater than a first thickness of the forward tip portion so as to form a first axial gap between the forward tip portion and the first aft wall. A second width of the aft shield mount trench in the axial direction may be greater than a second thickness of the aft tip portion so as to form a second axial gap between the aft turn-up and the second aft wall.

In some embodiments, a radial extent of the forward shield mount trench may be greater than a radial extent of the forward tip portion so as to form a first radial gap between a top surface of the forward tip portion and a top wall of the forward shield mount trench. A radial extent of the aft shield mount trench may be greater than a radial extent of the aft tip portion so as to form a second radial gap between a top surface of the aft tip portion and a top wall of the aft shield mount trench.

In some embodiments, a first axial load rail may be arranged on the first aft wall between the forward tip portion and the first aft wall. A second axial load rail may be arranged on the second aft wall between the aft tip portion and the second aft wall. The forward tip portion and the aft tip portion may engage the first axial load rail and the second axial load rail, respectively, when the gases moving along the primary gas path exert an axial force on the forward turn-up and the aft turn-up, respectively.

In some embodiments, at least one forward pin may extend through the first forward wall, the forward tip portion, and the first aft wall in the axial direction. At least one aft pin may extend through the second forward wall, the aft tip portion, and the second aft wall in the axial direction. The at least one forward pin and the at least one aft pin may transfer aerodynamic loads from the forward turn-up and the aft turn-up to the forward shield mount and the aft shield mount, respectively, when the gases moving along the primary gas path exert at least one of a radial force and a circumferential force on the forward turn-up and the aft turn-up, respectively.

In some embodiments, the heat shield may further include a protrusion extending radially away from the outer platform towards the carrier segment. The protrusion may surround at least a portion of an outer surface of the support spar that extends between the carrier segment and the outer platform so as to form a gap between an inner surface of the protrusion and the outer surface of the support spar.

In some embodiments, the turbine section may further include at least one of an axial load pad, a circumferential load pad, and at least one radial load pin. The axial load pad may be arranged on the carrier segment and may extend radially inward towards the outer platform so as to be axially adjacent to the protrusion. The axial load pad may interact with an outer protrusion wall of the protrusion so as to transfer aerodynamic loads from the heat shield to the carrier segment when the gases moving along the primary gas path exert a force on the heat shield.

In the some embodiments, the circumferential load pad may be arranged on the carrier segment and extends radially inward towards the outer platform so as to be circumferentially adjacent to the protrusion. The circumferential load pad may interact with the outer protrusion wall so as to transfer aerodynamic loads from the heat shield to the carrier segment when the gases moving along the primary gas path exert a force on the heat shield; and In some embodiments, the at least one radial load pin may extend through the protrusion into at least one wing of the carrier segment. The at least one wing may be arranged on the carrier segment and may extend radially inward past a top portion of the protrusion.

In some embodiments, the heat shield may further include an inner platform formed as one piece with the vane portion, the seal segment portion, and the forward and aft turn-ups.

In some embodiments, the vane assembly may include a sealing retainer disposed on an inner radially end of the support spar opposite the main body of the carrier segment. The sealing retainer may engage with the inner platform in order to seal a radially inner end of the vane assembly.

According to another aspect of the present disclosure, a turbine section of a gas turbine engine may include a carrier segment, a vane assembly, a turbine shroud assembly, and a heat shield. The carrier may include a main body, a forward shield mount, and an aft shield mount. The turbine shroud may include a turbine shroud portion of the carrier segment. The heat shield may comprise ceramic matrix composite materials and may be included as part of the vane assembly and the turbine shroud.

In some embodiments, the carrier segment may comprise metallic materials and extend partway around a central axis of the gas turbine engine. The main body may have a forward side, an aft side, at least one vane portion, and at least one turbine shroud portion located axially adjacent to the at least one vane portion.

In some embodiments, The vane assembly may include at least one support spar comprising metallic materials, the at least one support spar coupled to a corresponding vane portion of the at least one vane portion of the main body and extending radially inward from the main body of the carrier segment toward the central axis.

In some embodiments, the heat shield may be formed as a one piece component that is shaped to include (i) at least one vane having an outer platform and an airfoil that protect a corresponding support spar of the at least one support spar of the vane assembly, (ii) at least one seal segment portion that protects a corresponding turbine shroud portion of the at least one turbine shroud portion of the main body so as to provide the vane assembly and the turbine shroud assembly without a gap between the outer platform of the vane assembly and the turbine shroud assembly, and (iii) a forward turn-up extending radially outward from a forward edge of the heat shield and an aft turn-up extending radially outward from an aft edge of the heat shield, the forward turn-up and the aft turn-up coupling the heat shield to the carrier segment.

In some embodiments, a forward shield mount may be arranged on a forward side of the main body. An aft shield mount may be arranged on an aft side of the main body. The forward turn-up may couple to the forward shield mount and the aft turn-up may couple to the aft shield mount.

In some embodiments, the forward shield mount may extend at least partway over a circumferential extent of the forward turn-up and the aft shield mount may extend at least partway over a circumferential extent of the aft turn-up. The forward shield mount may include a first forward wall and a first aft wall defining a forward shield mount trench that at least partially surrounds a forward tip portion of the forward turn-up when the forward turn-up is coupled to the forward shield mount. The aft shield mount may include a second forward wall and a second aft wall defining an aft shield mount trench that at least partially surrounds an aft tip portion of the aft turn-up when the aft turn-up is coupled to the aft shield mount. A first width of the forward shield mount trench in an axial direction of the gas turbine engine may be greater than a first thickness of the forward tip portion so as to form a first axial gap between the forward tip portion and the first aft wall. A second width of the aft shield mount trench in the axial direction may be greater than a second thickness of the aft tip portion so as to form a second axial gap between the aft turn-up and the second aft wall.

In some embodiments, a radial extent of the forward shield mount trench may be greater than a radial extent of the forward tip portion so as to form a first radial gap between a top surface of the forward tip portion and a top wall of the forward shield mount trench. A radial extent of the aft shield mount trench may be greater than a radial extent of the aft tip portion so as to form a second radial gap between a top surface of the aft tip portion and a top wall of the aft shield mount trench.

In some embodiments, a first axial load rail may be arranged on the first aft wall between the forward tip portion and the first aft wall. A second axial load rail may be arranged on the second aft wall between the aft tip portion and the second aft wall. The forward tip portion and the aft tip portion may engage the first axial load rail and the second axial load rail, respectively, when the gases moving along the primary gas path exert an axial force on the forward turn-up and the aft turn-up, respectively.

In some embodiments, at least one forward pin may extend through the first forward wall, the forward tip portion, and the first aft wall in the axial direction. At least one aft pin may extend through the second forward wall, the aft tip portion, and the second aft wall in the axial direction. The at least one forward pin and the at least one aft pin may transfer aerodynamic loads from the forward turn-up and the aft turn-up to the forward shield mount and the aft shield mount, respectively, when the gases moving along the primary gas path exert at least one of a radial force and a circumferential force on the forward turn-up and the aft turn-up, respectively In some embodiments, the heat shield may further include at least one protrusion extending radially away from a corresponding outer platform of a corresponding vane towards the carrier segment. Each protrusion of the at least one protrusion may surround at least a portion of an outer surface of a corresponding support spar protected by the corresponding vane that extends between the carrier segment and the corresponding outer platform so as to form a gap between an inner surface of the protrusion and the outer surface of the corresponding support spar.

In some embodiments, the turbine section may further include at least one of an axial load pad, a circumferential load pad, and at least one radial load pin. The axial load pad may be arranged on the carrier segment and may extend radially inward towards the corresponding outer platform so as to be axially adjacent to the corresponding protrusion. The axial load pad may interact with an outer protrusion wall of the corresponding protrusion so as to transfer aerodynamic loads from the heat shield to the carrier segment when the gases moving along the primary gas path exert a force on the heat shield.

In the some embodiments, the circumferential load pad may be arranged on the carrier segment and extends radially inward towards the corresponding outer platform so as to be circumferentially adjacent to the corresponding protrusion. The circumferential load pad may interact with the outer protrusion wall so of the corresponding protrusion as to transfer aerodynamic loads from the heat shield to the carrier segment when the gases moving along the primary gas path exert a force on the heat shield; and In some embodiments, the at least one radial load pin may extend through the corresponding protrusion into a corresponding at least one wing of the carrier segment. The corresponding at least one wing may be arranged on the carrier segment and may extend radially inward past a top portion of the corresponding protrusion.

According to another aspect of the present disclosure, a method may include several steps. The method may include providing a turbine case, providing a carrier segment, providing a vane assembly, coupling the support spar to the main body of the carrier segment, providing a turbine wheel, providing a turbine shroud, forming a heat shield, and coupling a forward turn-up and an aft turn-up of the heat shield to the carrier segment.

In some embodiments, turbine case may be shaped to surround a central axis of a turbine section of a gas turbine engine.

In some embodiments, the carrier segment may comprise metallic materials and extend partway around the central axis. The carrier segment may include a main body coupled to the case, a forward shield mount arranged along a forward side of the main body, and an aft shield mount arranged along an aft side of the main body.

In some embodiments, the vane assembly may include a support spar comprising metallic materials.

In some embodiments, the support spar may be coupled to the main body of the carrier segment such that the support spar extends radially inward from the main body of the carrier segment toward the central axis.

In some embodiments, the turbine wheel may include a disk mounted for rotation about the central axis and a plurality of blades coupled to the periphery of the disk for rotation therewith about the central axis.

In some embodiments, the turbine shroud may be located co-axially with and radially outward of the turbine wheel to block gases moving along the primary gas path from moving over the blades of the turbine wheel without interacting with the turbine blades, the turbine shroud including a turbine shroud portion of the carrier segment.

In some embodiments, the forming of the heat shield may include forming the heat shield as a one piece component that is shaped to include (i) a vane portion having an outer platform and an airfoil that protect the support spar of the vane assembly, (ii) a seal segment portion that protects the turbine shroud portion of the carrier segment so as to provide the vane assembly and the turbine shroud without a gap between the outer platform of the vane assembly and the turbine shroud, and (iii) a forward turn-up extending radially outward from a forward edge of the outer platform and an aft turn-up extending radially outward from an aft edge of the seal segment portion, the heat shield included as part of the vane assembly and the turbine shroud.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
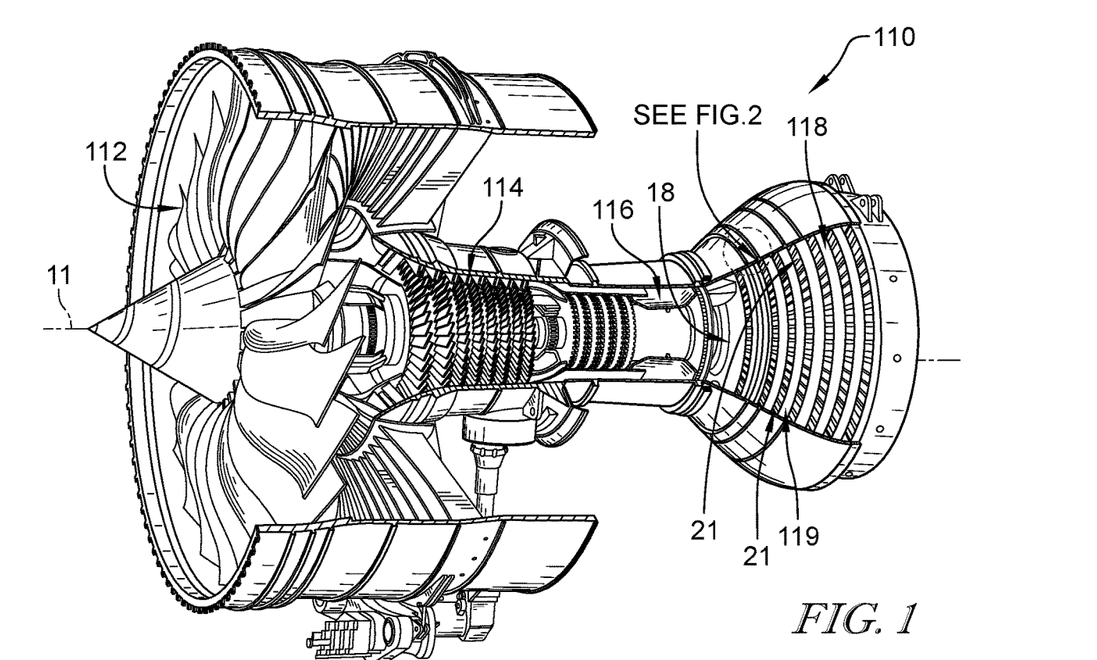
FIG. 1 is a cut-away perspective view of a gas turbine engine showing a fan driven by an engine core having a compressor, a combustor, a turbine, and a secondary flow assembly that extends into the turbine section as shown in FIGS. 2-9.
Figure 2:
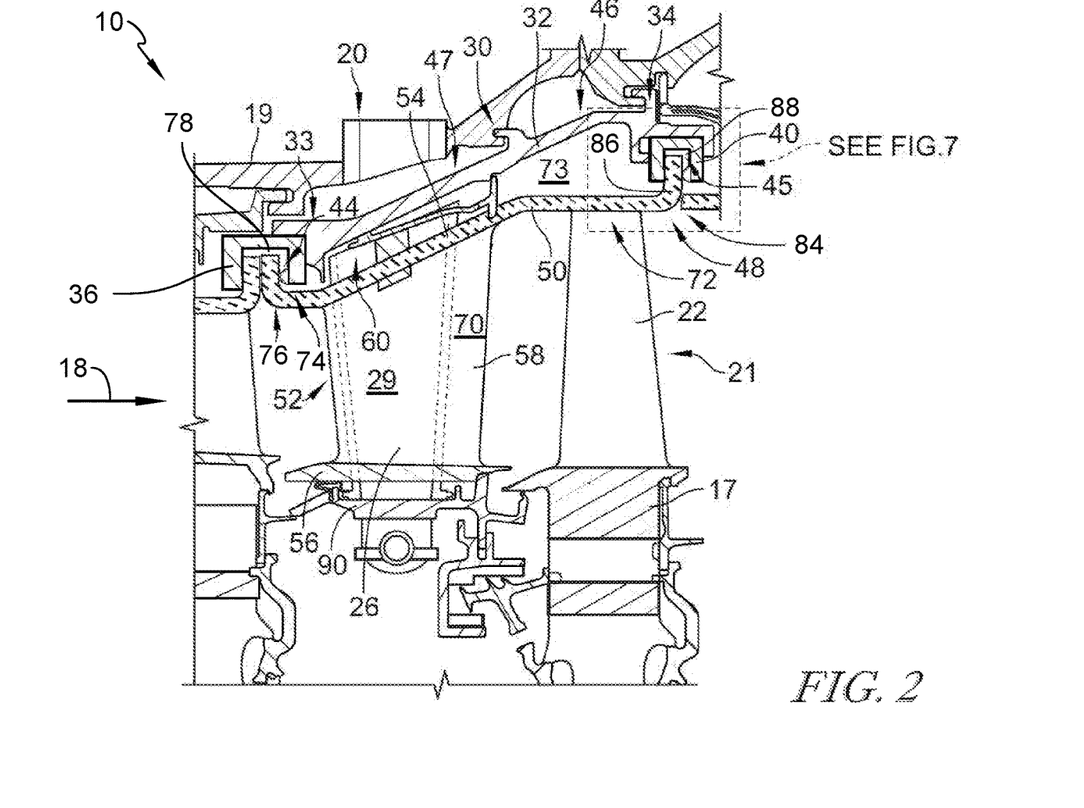
FIG. 2 is a detailed cross-section view of a turbine section of the gas turbine engine in FIG. 1 showing a heat shield comprised of ceramic matrix composite materials that is included in both a vane assembly and a turbine shroud of the turbine section, the heat shield formed as a one piece component that is shaped to include (i) a vane portion, (ii) a seal segment portion that extends from the vane portion so as to provide the vane assembly and the turbine shroud without a gap between an outer platform of the vane assembly and the turbine shroud, and (iii) forward and aft turn-ups extending radially outward to support coupling of the heat shield to a metallic carrier segment.
Figure 3:
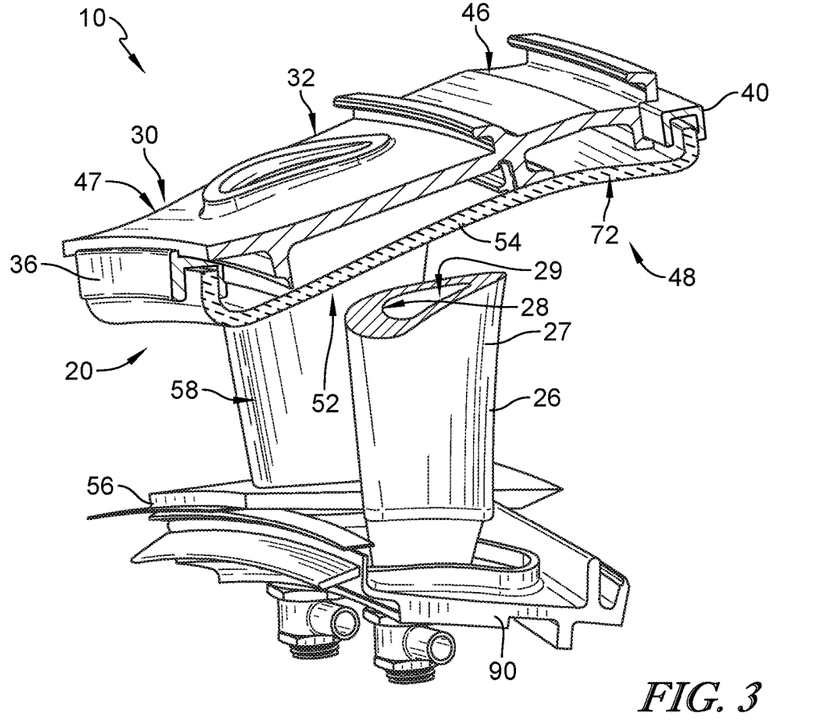
FIG. 3 is a perspective view of the turbine section of FIGS. 1 and 2 showing a cut-away portion such that the heat shield is visible, where a support spar comprising metallic materials and coupled to a main body of the carrier segment extending radially inward from the main body of the carrier segment toward a central axis is visible, and where the heat shield is coupled to the carrier segment via front and aft shield mounts that couple to the forward and aft turn-ups, respectively.
Figure 5:
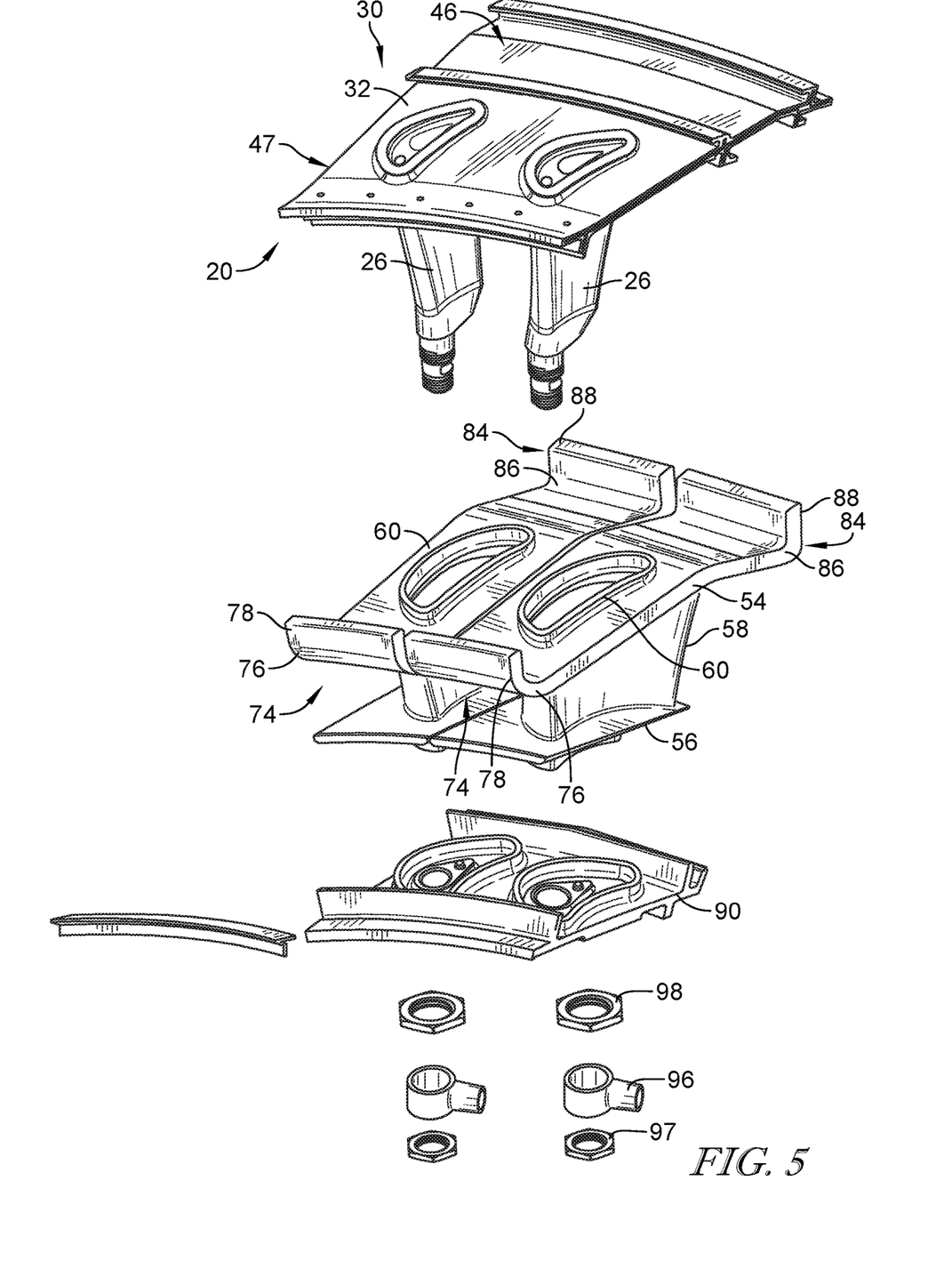
FIG. 5 is an exploded view of the turbine section of FIGS. 2, 3, and 5 showing the carrier segment including the main body and the support spar extending therefrom, and also suggesting the heat shield including the outer platform, the inner platform, the airfoil, the protrusion, the forward turn-up, and the aft turn-up.

A turbine section 10 of a gas turbine engine 110 with a heat shield 50 used as part of a vane assembly 20 and a turbine shroud 48 is shown in FIG. 2. The illustrative turbine section 10 includes the vane assembly 20, a turbine wheel assembly 21, a carrier segment 30, the turbine shroud 48, and the heat shield 50, as shown in FIGS. 2, 3, and 5. The vane assembly 20 interacts with hot gases flowing along a primary gas path 18 of the gas turbine engine 110 and conducts the hot gases around the vane assembly 20 toward the turbine wheel assembly 21 located downstream of the vane assembly 20, as suggested in FIGS. 1 and 2. The turbine shroud 48 is located co-axially with and radially outward of the turbine wheel assembly 21 to block gases moving along the primary gas path 18 from moving over blades 22 of the turbine wheel assembly 21 without interacting with the blades 22. As shown in FIGS. 2, 3, and 5, the vane assembly 20 includes a support spar 26 that extends radially inward through a vane portion 52 of the vane assembly 20.

The heat shield 50 of the gas turbine engine 110 is formed to encompass sections of both the vane assembly 20 and the turbine shroud 48 described above. The heat shield 50 is configured to eliminate gaps along the primary gas path 18 defined by the vane assembly 20 and the turbine shroud 48. In particular, the heat shield 50 is formed as a single, integral, one-piece heat shield 50 including the vane portion 52 that surrounds and protects the support spar 26 and a seal segment portion 72 that extends away from the vane portion 52 and protects a turbine shroud portion 46 of the carrier segment 30 as well as circumferentially surrounding the blades 22 of the turbine wheel assembly 21. The heat shield 50 further includes a forward turn-up 74 located on a forward side of the heat shield 50, and an aft turn-up 84 located on an aft side of the heat shield 50.

In the illustrative embodiment, the heat shield 50 is made from ceramic matrix composite materials, which inherently are able to withstand much higher temperatures than other materials typically utilized in gas turbine engines. As such, the ceramic matrix composite heat shield 50 guards against the high temperatures produced by the hot gases flowing along the primary gas path 18, and as a result increases durability and useful life of the vane assembly 20. Moreover, interfaces between components of gas turbine engines, for example between the vane portion 52 of the vane assembly 20 and the surrounding turbine shroud ring seal segment 72, typically require purging with secondary air and to seal against leakages through the interface between the two components. Forming these two components with a single, integral, one-piece heat shield 50 eliminates such leakages, as well as reducing part complexity and cost of production of the gas turbine engine 110 components.

As illustrated in FIG. 1, the gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about a central axis 11 of the gas turbine engine 110 and drive the compressor 114 and the fan 112. In other embodiments, the fan 112 may be omitted and the turbine 118 drives a propeller, drive shaft, or other suitable alternative.

The turbine 118 includes a plurality of static turbine vane rings 119 that are fixed relative to the central axis 11 and a plurality of turbine wheel assemblies 21, as suggested in FIG. 1. Each turbine vane ring 119 includes a plurality of turbine vane assemblies 20. The turbine vane assemblies 20, in particular the vane portion 52 of each assembly 20, are positioned so as to direct the hot gasses toward the turbine wheel assemblies 21 with a desired angle. The turbine wheel assemblies 21 each include a turbine wheel disk 17 from which the blades 22 radially extend. The hot gases contacting the blades 22 at the desired angle cause the turbine wheel assemblies 21 to rotate about the central axis 11.

A cross-sectional view of the turbine section 10 of the gas turbine engine 110 is shown in FIG. 2. In the illustrative embodiment, the turbine section 10 includes the vane assembly 20, the turbine wheel assembly 21, the carrier segment 30, the turbine shroud 48, and the heat shield 50. The carrier segment 30 of the turbine section 10 comprises preferably metallic materials and includes a main body 32 having a forward side 33 and an aft side 34, a forward shield mount 36, and an aft shield mount 40. The carrier segment 30 is arranged radially outward of the vane assembly 20 and extends at least partway circumferentially about the central axis 11. As can be seen in FIG. 2, the main body 32 of the carrier segment 30 may be rigidly attached to a turbine case 19 of the gas turbine engine 110 which circumferentially encloses the components of the turbine 118.

In the illustrative embodiment, the main body 32 of the carrier segment 30 extends axially over the vane assembly 20 and the turbine wheel assembly 21. In other embodiments, the main body 32 may extend further such that the carrier segment 30 encompasses multiple upstream and/or downstream vane assemblies 20 and/or turbine wheel assemblies 21. As shown in FIG. 2, the main body 32 is sloped in the axial direction in order to substantially conform with the slope of the heat shield 50, as will be described below, as well as to substantially conform with the slope of the turbine case 19. It can be envisioned that the slope of the main body 32 is different from the slope of the heat shield 50 and/or the turbine case 19 in order to allow for the formation of various cavities and interfaces between the components.

The main body 32 of the carrier segment 34 is divided into the turbine shroud portion 46 and a vane protecting portion 47. The turbine shroud portion 46 is located axially downstream of the vane protecting portion 47 and is aligned substantially co-axially with the turbine wheel assembly 21. The vane protecting portion 47 is located axially upstream of the turbine shroud portion 46 and is aligned substantially co-axially with the vane portion 52 of the heat shield 50. As illustrated in FIG. 2, the turbine shroud portion 46 and the seal segment portion 72 of the heat shield 50 form the turbine shroud 48, which circumferentially surrounds the blades 22 of the turbine wheel assembly 21 in order to block gases moving along the primary gas path 18 from moving over blades 22 without interacting with the blades 22. As also illustrated in FIG. 2, the vane protecting portion 47 and the vane portion 52 of the heat shield 50 form at least a portion of the vane assembly 20, as will be described in greater detail below.

The forward shield mount 36 and the aft shield mount 40 are arranged on the forward and rear sides 33, 34 of the main body 32, respectively. As shown in FIGS. 2 and 3, the forward shield mount 36 and the aft shield mount 40 are separate components from the main body 32 that are rigidly attached to the main body 32. In other embodiments, the forward shield mount 36 and the aft shield mount 40 may be formed integrally with the main body 32 such that the main body 32, the forward shield mount 36 and the aft shield mount 40 form a single, one-piece component.

As can be seen in FIGS. 2-4 and 7, the forward shield mount 36 is formed to mate and couple with forward turn-up 74 of the heat shield 50 and the aft shield mount 40 is formed to mate and couple with aft turn-up 84, as will be described in greater detail below. In some embodiments, the forward and aft shield mounts 36, 40 possess substantially identical shapes, while in other embodiments, the shield mounts 36, 40 may include differing dimensions so as to better accommodate other components of the gas turbine engine 110. As most clearly shown in FIGS. 2 and 4, the forward and aft shield mounts 36, 40 may include a generally rectangular, prismatic shape and each have a longitudinal extent that corresponds with a longitudinal extent of the forward and aft turn-ups 74, 84.

In the illustrative embodiment, the forward shield mount 36 includes a first forward wall 37 and a first aft wall 38 defining a forward shield mount trench 39. The first forward wall 37 and the first aft wall 38 run substantially straight along the longitudinal extent of the shield mount 36. Similarly, the aft shield mount 40 includes a first forward wall 41 and a second aft wall 42 defining a forward shield mount trench 43. The second forward wall 41 and the second aft wall 42 run substantially straight along the longitudinal extent of the shield mount 40. The width of the forward and aft shield mount trenches 39, 43, or in other words the spacing between the first forward and aft walls 37, 38 and the second forward and aft walls 41, 42, is formed to be greater than a thickness of a tip portion 78, 88 of the forward and aft turn-ups 74, 84, so as to provide a gap 44, 45 between a back wall of the tip portions 78, 88 and the first and second aft walls 38, 42, respectively.

Figure 4:
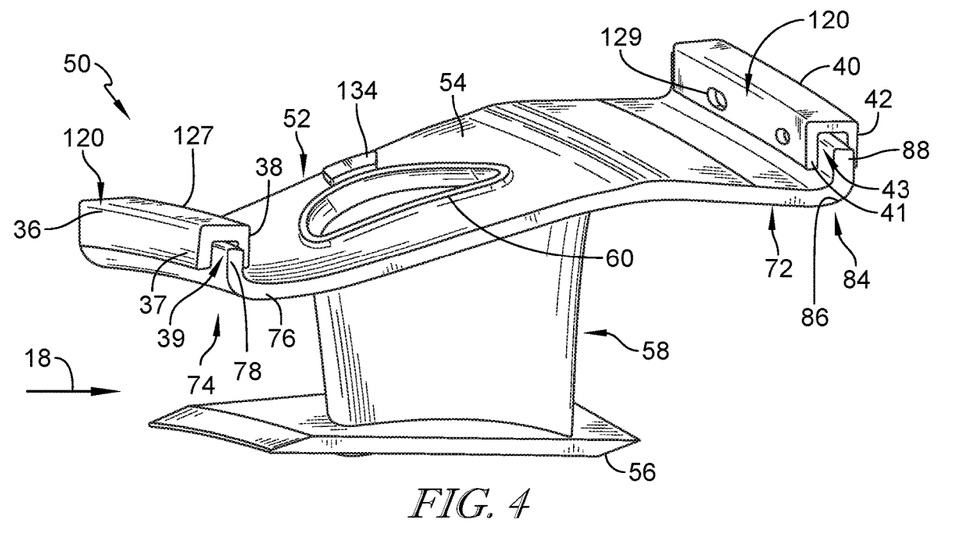
FIG. 4 is a perspective view of the heat shield of FIGS. 2-4 showing an outer platform, an inner platform, and an airfoil of the heat shield, where the heat shield is coupled to the carrier segment via front and aft shield mounts that couple to the forward and aft turn-ups.

The forward shield mount 36 and/or the aft shield mount 40 may also be provided with at least one forward load pin hole 127 and at least one aft load pin hole 129, as shown in FIG. 4. Accordingly, various load transfer elements may be inserted into the pin holes 127, 129 and into the gaps 44, 45 formed between the tip portions 78, 88 and the first and second aft walls 38, 42 in order to dampen and absorb directional loads placed on the components of the turbine section 10 of the gas turbine engine 110 by the hot gases as well as by relative movement of the components. The load transfer elements may also allow for thermal expansion and contraction of the components of the gas turbine engine 110 that may occur due to components being constructed from different materials, such as metallic materials and ceramic matrix composite materials.

As can be seen in FIG. 2, the vane assembly 20 is arranged axially adjacent to the turbine wheel assembly 21 so as to allow for the hot gases flowing along the primary gas path 18 to be directed toward the blades 22 of the turbine wheel assembly 21. As described above, the vane assembly 20 includes the vane portion 52 of the heat shield 50, as well as the vane protecting portion 47 of the carrier segment 32. In the illustrative embodiment, the vane assembly 20 further includes the support spar 26, which preferably comprises metallic materials. As can be seen in FIGS. 2-4, the support spar 26 is rigidly attached to an inner surface of the vane protecting portion 47 of the main body 32 of the carrier segment 30 and extends radially inward through an airfoil 58 of the vane portion 52 of the heat shield 50. The support spar 26 includes a spar outer surface 27 and a spar inner surface 28 which defines an interior cavity, or feed duct 29, which runs along the longitudinal extent of the support spar 26. Cooling air flow may be transported through the feed duct 29 in order to cool the metallic support spar 26 as well as the surrounding components of the vane assembly 20.

The heat shield 50 of the turbine section 10 is shown in FIGS. 2-6. As can be seen most clearly in FIGS. 4 and 5, the heat shield 50 is formed as a single, one-piece component and comprises ceramic matrix composite materials. The heat shield 50 includes the vane portion 52, the seal segment portion 72, and the forward and aft turn-ups 74, 84. As can be seen in FIG. 2, the vane portion 52 is located substantially co-axially with the vane protecting portion 47 of the carrier segment 30 and the support spar 26 extending therefrom. The seal segment portion 72 is located substantially co-axially with the turbine shroud portion 46 of the carrier segment 30.

In the illustrative embodiment, the vane portion 52 of the heat shield 50 includes an outer platform 54, an inner platform 56, and an airfoil 58. The vane portion 52 may also include a protrusion 60 extending radially away from the outer platform 54 which will be described in further detail below. The outer platform 54 defines an outer boundary of the gas path 18. The inner platform 56 is spaced apart radially from the outer platform 54 relative to the central axis 11 to define an inner boundary of the gas path 18. The airfoil 58 extends radially between and interconnects the outer platform 54 and the inner platform 56. As can be seen in FIG. 4, the airfoil 58 is shaped to redirect gases flowing through the gas path 18 and to shield the support spar 26 from the hot gases in the gas path 18.

The airfoil 58 is formed to define a heat shield cavity 70 that extends radially into the airfoil 58 as shown in FIG. 2. Illustratively, the heat shield cavity 70 may extend radially entirely through the outer platform 54, the inner platform 56, and the airfoil 58. As such, the support spar 26 is formed to extend from the carrier segment 30 radially inwardly through the heat shield cavity 70 formed in the airfoil 58. The support spar 26 may be rigidly attached at an innermost radial end to an inner seal plate 90 of the vane assembly 20. The inner seal plate 90 is attached to a radially inner surface of the inner platform 56 of the vane portion 52 of the heat shield 50. In the illustrative embodiment, the support spar 26 is engaged directly or indirectly via load pads, seals, etc., with either the hole formed in the outer platform 54 through which the spar 26 extends or a protrusion 60 extending from the outer platform 54 to receive force loads that act on the vane portion 52 of the heat shield 50 and to transfer the force loads to the turbine casing 19, as suggested in FIG. 2. In other embodiments, the support spar 26 may engage directly with an inner airfoil surface 64 of the airfoil 58 via load pads, seals, etc.

Figure 6:
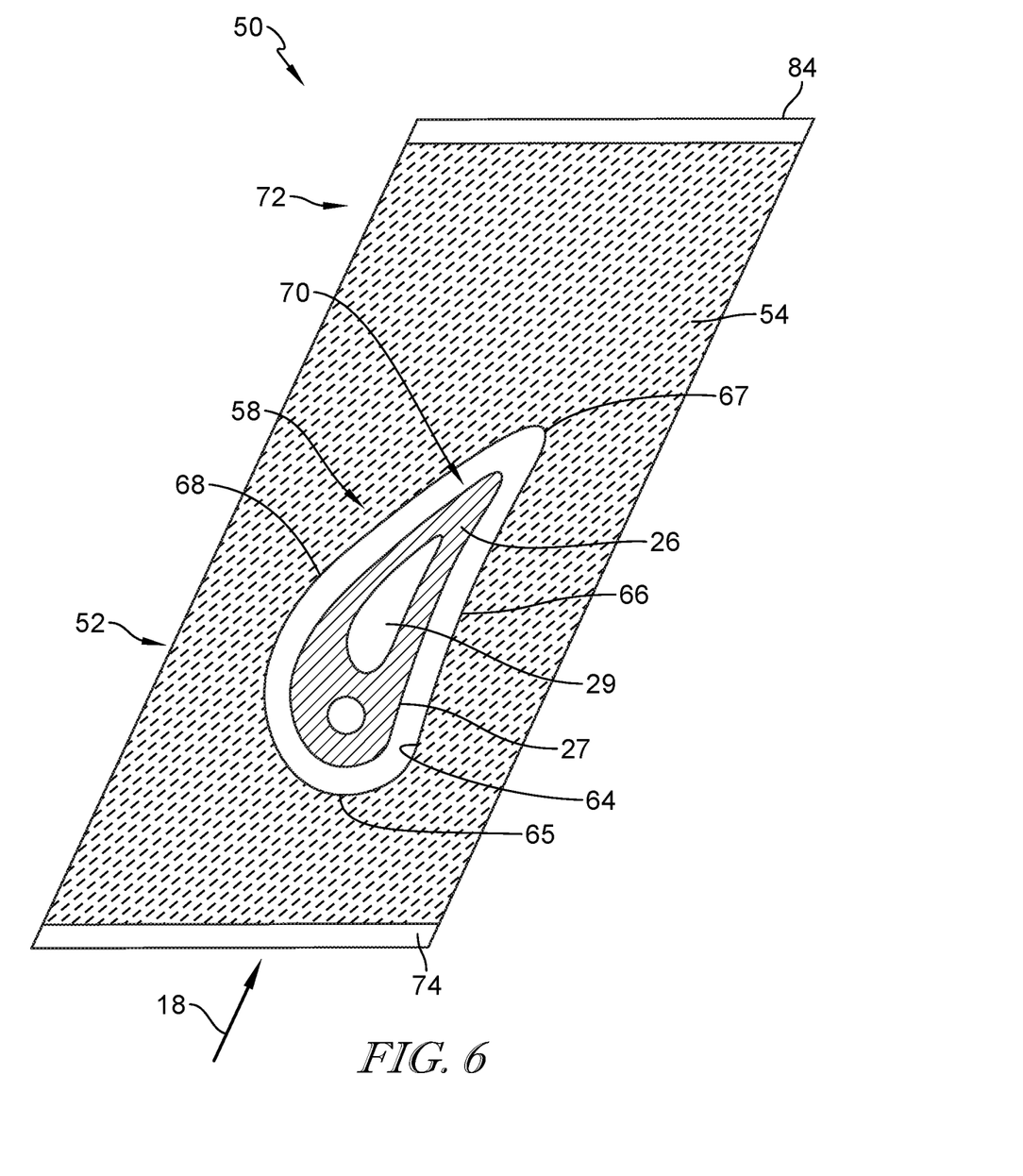
FIG. 6 is a cross-sectional view of the heat shield of FIGS. 2-5 showing a suction side, a pressure side, a leading edge, and a trailing edge of the airfoil, and also showing the vane portion, seal segment portion, the forward and aft turn-ups, and the outer platform of the heat shield.

As shown in detail in FIG. 6, the ceramic matrix composite airfoil 58 includes an airfoil outer surface 62, the airfoil inner surface 64, a leading edge 65, a trailing edge 67, a pressure side 66, and a suction side 68. The airfoil outer surface 62 interacts with the hot gases in the gas path 18. As can be seen in FIG. 6, the airfoil inner surface 64 and the outer surface of the support spar 27 create the heat shield cavity 70 inside the ceramic matrix composite airfoil 58 that the support spar 26 extends radially through.

The leading edge 65 of the airfoil 58 is positioned axially forward of the trailing edge 67 as shown in FIG. 4. The suction side 68 is located between the leading edge 65 and the trailing edge 67. When the gas turbine engine 110 is in use, the hot gases that pass over the suction side 68 exert a pulling force on the suction side 68. Likewise, the pressure side 66 is located between the leading edge 65 and the trailing edge 67 and circumferentially adjacent to the suction side 68 on the ceramic matrix composite airfoil 58. The pressure side 66 experiences a pushing force from the hot gases of the gas path 18 when the gas turbine engine 110 is in use.

In the illustrative embodiment, the outer platform 54 of the vane portion 52 is formed integrally with the seal segment portion 72, as shown in FIGS. 2-6. Accordingly, the vane portion 52 and the seal segment portion 72 together form the single, one-piece heat shield 50. In at least some embodiments, the seal segment portion 72 is formed substantially similarly to the outer platform 54, in particular having a similar thickness and shape. In other embodiments, the seal segment portion 72 may have a different thickness and shape in order to accommodate requirements of other components within the turbine section 10. As can be seen in FIGS. 2-6, the seal segment portion 72 extends axially downstream from the outer platform 54 and terminates axially downstream of the turbine wheel assembly 21.

In the illustrative embodiment, the seal segment portion 72 along with the turbine shroud portion 46 of the carrier segment 30 define the turbine shroud 48. A radially inner surface of the seal segment portion 72 may be formed as a blade track for the blades 22 of the turbine wheel assembly 21 to run along during rotation of the turbine wheel 21. Ceramic matrix composite materials, as used in the seal segment portion 72, may have a coefficient of thermal expansion that is lower than the coefficient of thermal expansion of metallic materials, as would be utilized in the blades 22 of the turbine wheel assembly 21. This difference in coefficients of thermal expansion may result in varying gaps between the ceramic matrix composite blade track of the seal segment portion 72 and the metallic blades 22. As such, a clearance control mechanism may be utilized within the turbine shroud 48, in particular at an interface between the turbine shroud portion 46 of the carrier segment 30 and the seal segment portion 72, in order to allow for thermal expansion of the blades 22 during operation of the gas turbine engine 110.

In at least some embodiments, the heat shield 50 includes a protrusion 60 that extends radially outward from a top surface of the outer platform 54 towards the carrier segment 30. The protrusion 60 is formed integrally with the other components of the heat shield 50. The protrusion 60 is configured to surround at least a portion of the outer surface 27 of the support spar 26, in particular a portion that extends radially outward out of the airfoil 58. The protrusion 60 may extend partway between the outer platform 54 and the carrier segment 30, or may extend fully between the platform 54 and the carrier segment 30 in other embodiments.

As can be seen in FIGS. 2-6, the heat shield 50 further includes the forward turn-up 74 and the aft turn-up 84. The forward turn-up 74 is located on a forward end of the outer platform 54, and the aft turn-up 84 is located on an aft end of the seal segment portion 72. Illustratively, the forward turn-up 74 includes a forward transition portion 76 and a forward tip portion 78. Similarly, the aft turn-up 84 includes an aft transition portion 86 and an aft tip portion 88. The forward transition portion 86 and the aft transition portion 86 may each turn at a ninety (90) degree angle, as shown in FIGS. 2-5, or may turn at different angles in other embodiments. As also shown in FIGS. 2-5, the thickness of the outer platform 54 is maintained into and throughout the forward turn-up 74, and likewise, the thickness of the seal segment portion 72 is maintained into and throughout the aft turn-up 84. However, it can be envisioned that the forward and aft turn-ups 74, 84 possess differing thicknesses and turn angles so as to mitigate induced stresses, as well as to accommodate requirements of the other components within the gas turbine engine 110.

Figure 9:
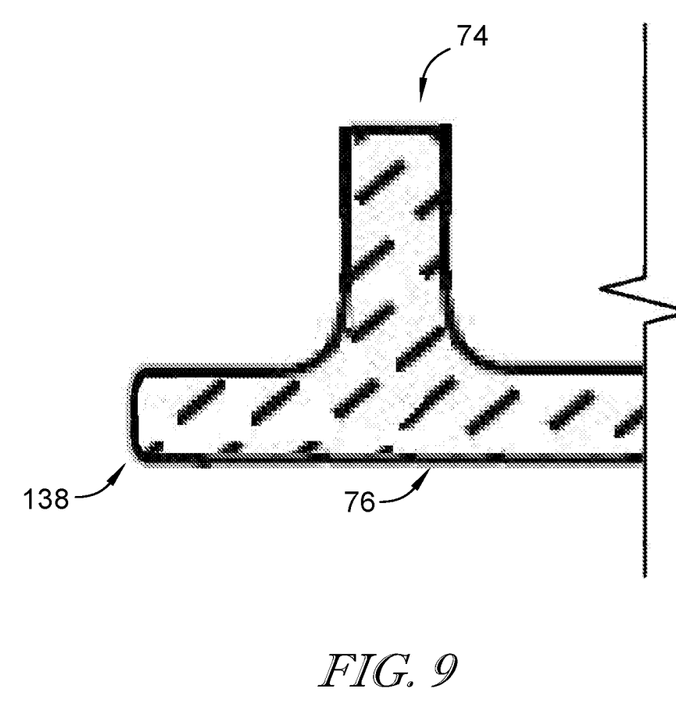
FIG. 9 is a cross-section view of an extension member extending away from a forward transition portion of the forward turn-up of FIG. 2.

In some embodiments, as shown in FIGS. 2 and 9, the forward and/or aft turn-ups 74, 84 may be formed with an extension member 138 that is formed integrally with the respective transition portion 76, 86 of the turn-up 74, 84 and extends away from a forward or aft edge of the transition portion 76, 86 toward an adjacent heat shield 50 of an upstream or downstream turbine section 10. For example, as shown in FIG. 9, the forward turn-up 74 includes the extension member 138 extending forwardly off of the transition portion 76. As shown in FIG. 2, this extension member 138 may be arranged on a forward turn-up downstream of the aft turn-up 84 of the turbine section 10. The extension member 138 extends to the transition portion 86 of the aft turn-up 84, thus providing additional sealing effects for adjacent heat shields in the gas turbine engine 110.

In the illustrative embodiment, the forward and aft turn-ups 74, 84 are configured to engage with and couple to the forward and aft shield mounts 36, 40, respectively. In particular, the forward tip portion 78 is formed to fit within the forward shield mount trench 39, and the aft tip portion 88 is formed to fit within the aft shield mount trench 43. As can be seen in FIG. 2, the heat shield 50 being mounted on the carrier segment 30 creates a plurality of cavities 73 between the heat shield 50 and the carrier segment 30. Because the heat shield 50 is formed as a single, one-piece component, sealing and pressurizing efficiencies of the cavities 73 is improved.

In designs in accordance with the present disclosure, the interface gap that typically exists between the outer platform 54 of the vane portion 52 and the seal segment portion 72 is removed. Thus, any leakages of compressed air or other fluid that may permeate through the interface are eliminated. Additionally, the sealing in the area of the turn-ups 74, 84 is improved. In some designs, seals would need to be employed between the surfaces of the outer platform 54 of the heat shield 50 and the above carrier segment 30. In the present embodiment, the curled shape of the forward and aft turn-ups 74, 84, as well as the engagement of the turn-ups 74, 84 with the shield mounts 36, 40 can eliminate the need for additional sealing in the area. Moreover, load transfer elements, which will be described in greater detail below, may be disposed within the shield mount trenches 39, 43 that, in addition to absorbing and transferring aerodynamic loads, also act as chordal seals that further seal off the hot gases from entering undesired areas of the turbine section 10. In particular, when Any suitable coupling mechanisms may be used to couple the tip portions 78, 88 to the first and second forward walls 37, 41 of the forward and aft shield mounts 36, 40, such as fasteners, hangers, or rails. The manner in which the forward and aft turn-ups 74, 84 are coupled to the mounts 36, 40 should allow for aerodynamic loading of the heat shield 50 during operation of the gas turbine engine 110. For example, when hot gases flowing along the primary gas path 18 impact the vane portion 52 of the heat shield 50, the entire heat shield 50 is stressed and loaded primarily axially in the downstream direction. Accordingly, the forward and aft turn-ups 74, 84 may move in the downstream direction (as well as other directions based on the radial and circumferential components of the aerodynamic forces) within the forward and aft shield mount trenches 39, 43. Because the components of the heat shield 50, including the turn-ups 74, 84, are constructed from ceramic matrix composite materials and accordingly have low tensile strength properties, permitting relative movement of the components during use of the gas turbine engine 110 increases the durability and life of the ceramic matrix composite components.

Figure 7:
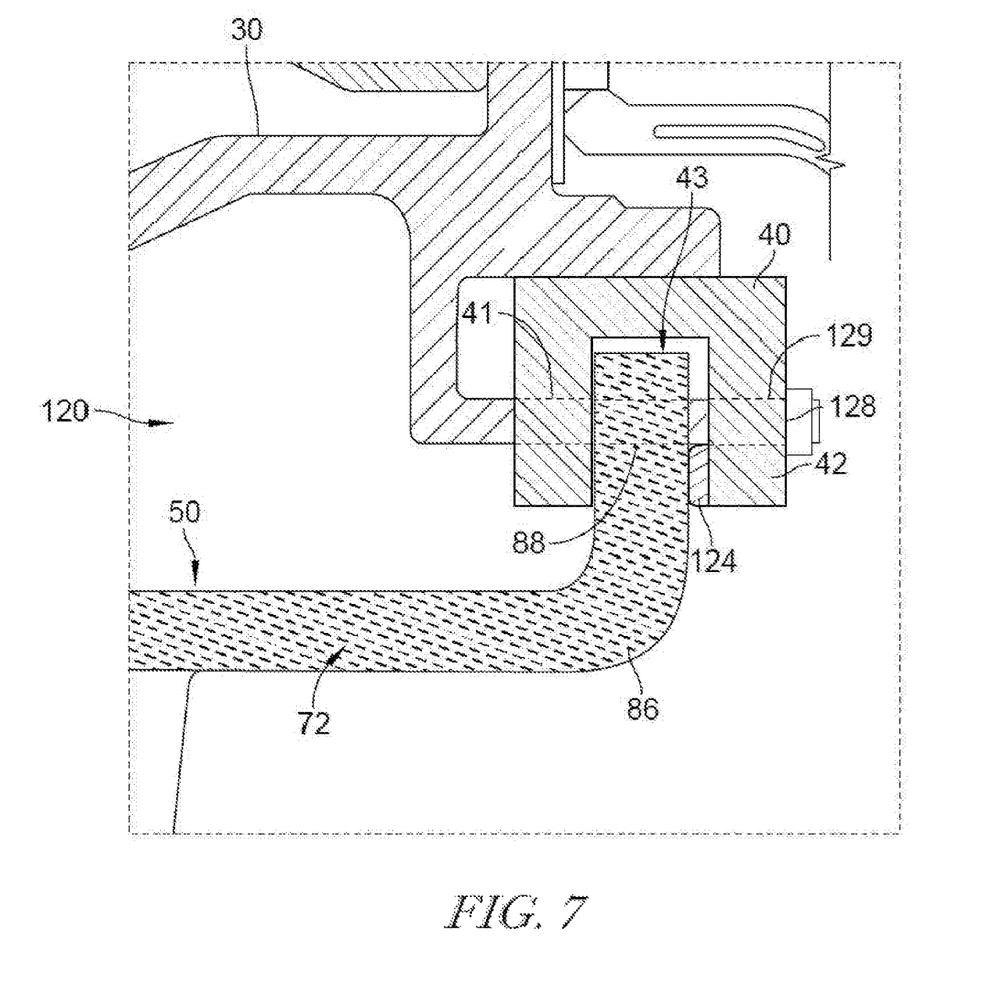
FIG. 7 is a cross-sectional view of the aft turn-up of the heat shield of FIGS. 2-6 showing the seal segment portion, the aft transition portion, the aft tip portion, and a turn-up load transfer assembly arranged within a gap formed between the tip portion and an aft wall of the aft shield mount and also arranged within a load pin hole extending through the aft wall, the tip portion, and a forward wall of the aft shield mount.

In the illustrative embodiment, relative movement of the heat shield 50, as well as load transfer management, is controlled via at least one of a turn-up load transfer assembly 120 and a protrusion load transfer assembly 130, as shown in FIGS. 2, 4, 7, 8A, 8B, and 8C. The turn-up load transfer assembly 120 may include at least one forward axial load element 122, at least one aft axial load element 124, at least one forward load pin 126, at least one aft load pin 128, as shown in FIGS. 4 and 7. The protrusion load transfer assembly 130 may include at least one axial load pad 132, at least one circumferential load pad 134, and at least one radial load pin 136, as shown in FIGS. 4, 8A, 8B, and 8C.

The turn-up load transfer assembly 120 is configured to control the aerodynamic loads exerted on the heat shield 50 via the forward and aft turn-ups 74, 84. In the illustrative embodiment, at least one forward axial load element 122 is positioned within the gap 44 formed between the first aft wall 38 and the forward tip portion 78 of the forward turn-up 74. Likewise, at least one aft axial load element 124 is positioned within the gap 45 formed between the second aft wall 42 and the aft tip portion 88 of the aft turn-up 84. In at least some embodiments, the forward and aft load elements 122, 124 are formed as load pads, in particular axial load pad rails that extend along a longitudinal extent of the first and second aft walls 38, 42.

In operation, when the heat shield 50 is loaded axially in the downstream direction by hot gases flowing along the primary gas path 18, the engagement between the turn-ups 74, 84 and the forward and aft load elements 122, 124 is increased. As a result, tensile loads placed on the heat shield 50 are reduced. Moreover, the increased engagement between the turn-ups 74, 84 and the load elements 122, 124 causes increased sealing in those areas. In other words, the load elements 122, 124 act as chordal seals between components and cavities of the turbine section 10 when engaged with the turn-ups 74, 84. The increase in engagement of the turn-ups 74, 84 and the load elements 122, 124 augments the sealing properties of the load elements 122, 124, further reducing leakages and improving engine cycle efficiency.

The turn-up load transfer assembly 120 may also be configured to control the aerodynamic loads exerted on the heat shield 50 in directions other than the axial direction. The control of such aerodynamic loads, for example in the radial, circumferential, or a combination of the three vectors, is also controlled via the forward and aft turn-ups 74, 84. In the illustrative embodiment, at least one forward load pin 126 is inserted in the at least one forward load pin hole 127 that extends straight through the first forward and aft walls 37, 38 and a first tip hole 79 of the forward tip portion 78. The at least one forward load pin 126 extends through the at least one forward load pin hole 127. A small outer clearance between the pin 126 and the hole 127 is provided so as to allow play in the radial and circumferential direction when the heat shield 50 is loaded in the radial and/or circumferential directions.

Likewise, at least one aft load pin 128 is inserted in the at least one aft load pin hole 129 that extends straight through the second forward and aft walls 41, 42 and a second tip hole 89 of the aft tip portion 88. The at least one aft load pin 128 extends through the at least one aft load pin hole 129. A small outer clearance between the pin 128 and the hole 129 is provided so as to allow play in the radial and circumferential direction when the heat shield 50 is loaded in the radial and/or circumferential directions. In at least some embodiments, the pin 128 may be an extension of the carrier segment 30, as shown in FIG. 7.

In operation, when the heat shield 50 is loaded radially and/or circumferentially by hot gases flowing along the primary gas path 18, the pins 126, 128 may move relative to the holes 127, 129. As a result, tensile loads placed on the heat shield 50 are reduced.

It should be appreciated that the turn-up load transfer assembly 120 may include some or all of the load transfer features, including the load elements 122, 124 and load pins 126, 128, discussed above. The load elements 122, 124 and load pins 126, 128 may be formed rails, pins, pads, or any other suitable methods of absorbing and transferring aerodynamic loads.

Similarly to the turn-up load transfer assembly 120, the protrusion load transfer assembly 130 is configured to control the aerodynamic loads exerted on the heat shield 50 via the protrusion 60. The protrusion load transfer assembly 130 may include at least one axial load pad 132, at least one circumferential load pad 134, and at least one radial load pin 136, as shown in FIGS. 4, 8A, 8B, and 8C.

Figure 8A:
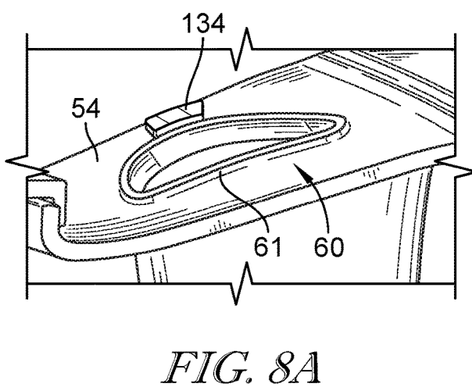
FIG. 8A is a perspective view of the outer platform and protrusion of the heat shield of FIGS. 2-7 showing a circumferential load pad of a protrusion load transfer assembly arranged and extending from the carrier segment so as to interact with the protrusion.

The at least one circumferential load pad 134 is shown in FIG. 8A. In at least some embodiments, the circumferential load pad 134 is arranged on an inner side of the carrier segment 30 circumferentially adjacent to the protrusion 60 and extends radially inwardly toward the outer platform 54 of the heat shield 50. As can be seen in FIG. 8A, the circumferential load pad 134 extends beyond the top surface of the protrusion 60. As a result, when the heat shield 50 is loaded circumferentially by hot gases flowing along the primary gas path 18, the engagement between an outer protrusion surface 61 of the protrusion 60 and the circumferential load pad 134 is increased. As a result, tensile loads placed on the heat shield 50 are reduced.

Figure 8B:
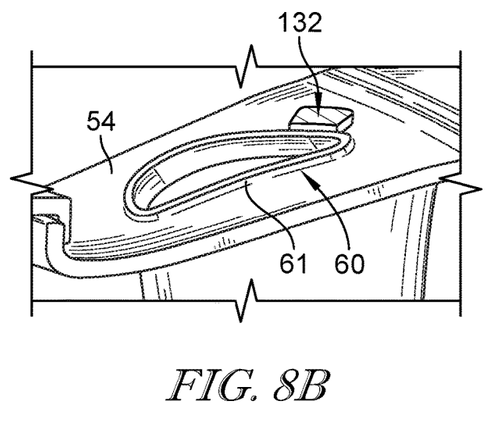
FIG. 8B is a perspective view of the outer platform and protrusion of the heat shield of FIGS. 2-7 showing an axial load pad of the protrusion load transfer assembly arranged and extending from the carrier segment so as to interact with the protrusion.

Similarly, the at least one axial load pad 132 is shown in FIG. 8B. In at least some embodiments, the axial load pad 132 is arranged on an inner side of the carrier segment 30 axially adjacent to the protrusion 60 and extends radially inwardly toward the outer platform 54 of the heat shield 50. As can be seen in FIG. 8B, the axial load pad 132 extends beyond the top surface of the protrusion 60. As a result, when the heat shield 50 is loaded axially by hot gases flowing along the primary gas path 18, the engagement between the outer protrusion surface 61 and the axial load pad 132 is increased. As a result, tensile loads placed on the heat shield 50 are reduced.

Figure 8C:
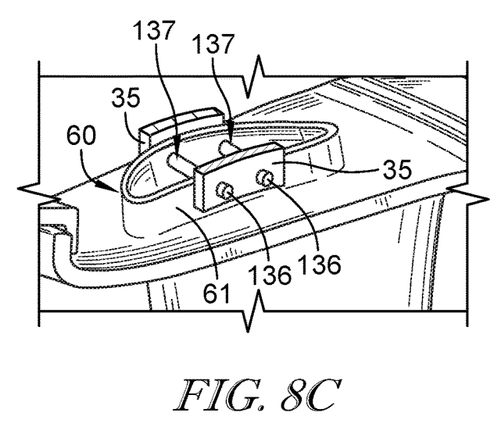
FIG. 8C is a perspective view of the outer platform and protrusion of the heat shield of FIGS. 2-7 showing at least one radial load pin of the protrusion load transfer assembly arranged and extending through the protrusion and the carrier segment.

FIG. 8C shows the at least one radial load pin 136, in particular four radial load pins 136. The carrier segment 30 includes at least one wing 35 that extends radially inward toward the outer platform 54. FIG. 8C shows two wings 35 arranged on opposing circumferential sides of the protrusion 60, although the wings 35 may extend relative to any side of the protrusion 60. The radial load pins 136 extend through a corresponding radial load pin hole 137 formed through the wing 35 and the protrusion 60. As can be seen in FIG. 8C, the wings 35 extend beyond the top surface of the protrusion 60. Moreover, a small outer clearance between the pin 136 and the hole 137 is provided so as to allow play in the radial and circumferential direction when the heat shield 50 is loaded in the radial and/or circumferential directions.

In operation, when the heat shield 50 is loaded radially and/or circumferentially by hot gases flowing along the primary gas path 18, the pins 136 may move relative to the holes 137. As a result, tensile loads placed on the heat shield 50 are reduced.

In at least some embodiments, the ceramic matrix composite materials used in the components may lower large thermal gradients that arise when much cooler secondary cooling air passes over the ceramic matrix composite materials of the turbine section 10. Moreover, the need for additional seals at part interfaces, for example between the vane portion 52 and the seal segment portion 72 of the heat shield 50, is eliminated. Additional seals can drive high mechanical loads into the ceramic matrix composite parts, which may wear on the ceramic matrix composite parts over time along with relative movement through the flight cycle.

It can be envisioned that in alternative embodiments, the support spar 26 may not be necessary. In an alternative embodiment, the load transfer assemblies 120, 130, or other similar load transferring features, may be constructed to be sufficiently capable to withstand the loads applied to the heat shield 50. The elimination of the support spar 26 simplifies the turbine section 10 so as to reduce complexity and production costs. Such a turbine section 10 may require removal of a static inter-stage seal and replacement with a rotating interface on the inner platform of the heat shield 50. In at least one embodiment, incorporation of an inter-stage seal support feature on the heat shield 50 may be necessary.

It can be appreciated that in at least some embodiments, the heat shield 50 may encompass multiple combinations of stages of the turbine 118. For example, the heat shield 50 may encompass a single vane portion and turbine shroud, as described in the embodiments above. Alternatively, the heat shield 50 may encompass a single turbine shroud having two vane portions on each side of the turbine shroud. Alternatively, the heat shield 50 may encompass a single vane portion having two turbine shrouds on each side of the vane portion. In at least some embodiments, an extension member made of ceramic matrix composite material may be arranged between the transition portions of adjacent turn-ups so as to eliminate the recess formed between adjacent turn-ups. For example, as is shown in FIG. 2, an extension member may be arranged between the forward transition portion 76 of the forward turn-up 74 and the transition portion of the adjacent aft turn-up of the adjacent heat shield (to the left of FIG. 2). Any number of possible combinations may be utilized in the present disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine section of a gas turbine engine, the turbine section comprising
a turbine case shaped to surround a central axis of the turbine section,
a carrier segment comprising metallic materials and extending partway around the central axis, the carrier segment including a main body coupled to the case, a forward shield mount arranged along a forward side of the main body, and an aft shield mount arranged along an aft side of the main body,
a vane assembly including a support spar comprising metallic materials, the support spar coupled to the main body of the carrier segment and extending radially inward from the main body of the carrier segment toward the central axis,
a turbine wheel including a disk mounted for rotation about the central axis and a plurality of blades coupled to the periphery of the disk for rotation therewith about the central axis,
a turbine shroud located co-axially with and radially outward of the turbine wheel to block gases moving along a primary gas path from moving over the blades of the turbine wheel without interacting with the turbine blades, the turbine shroud including a turbine shroud portion of the carrier segment, and
a heat shield comprising ceramic matrix composite materials included as part of the vane assembly and the turbine shroud, the heat shield formed as a one piece component that is shaped to include (i) a vane portion having an outer platform and an airfoil that protect the support spar of the vane assembly, (ii) a seal segment portion that protects the turbine shroud portion of the carrier segment so as to provide the vane assembly and the turbine shroud without a gap between the outer platform of the vane assembly and the turbine shroud, and (iii) a forward turn-up extending radially outward from a forward edge of the outer platform and an aft turn-up extending radially outward from an aft edge of the seal segment portion, the forward turn-up and the aft turn-up coupling the heat shield to the carrier segment.

2. The turbine section of claim 1, wherein
the forward shield mount is rigidly attached to the forward side of the main body of the carrier segment, and
the aft shield mount is rigidly attached to the aft side of the main body of the carrier segment.

3. The turbine section of claim 2, wherein
the forward turn-up is configured to couple to the forward shield mount, and
the aft turn-up is configured to couple to the aft shield mount.

4. The turbine section of claim 3, wherein
the forward shield mount extends at least partway over a circumferential extent of the forward turn-up, the aft shield mount extends at least partway over a circumferential extent of the aft turn-up, the forward shield mount includes a first forward wall and a first aft wall defining a forward shield mount trench that at least partially surrounds a forward tip portion of the forward turn-up when the forward turn-up is coupled to the forward shield mount, the aft shield mount includes a second forward wall and a second aft wall defining an aft shield mount trench that at least partially surrounds an aft tip portion of the aft turn-up when the aft turn-up is coupled to the aft shield mount, a first width of the forward shield mount trench in an axial direction of the gas turbine engine is greater than a first thickness of the forward tip portion so as to form a first axial gap between the forward tip portion and the first aft wall, and a second width of the aft shield mount trench in the axial direction is greater than a second thickness of the aft tip portion so as to form a second axial gap between the aft turn-up and the second aft wall.

5. The turbine section of claim 4, wherein a radial extent of the forward shield mount trench is greater than a radial extent of the forward tip portion so as to form a first radial gap between a top surface of the forward tip portion and a top wall of the forward shield mount trench, and a radial extent of the aft shield mount trench is greater than a radial extent of the aft tip portion so as to form a second radial gap between a top surface of the aft tip portion and a top wall of the aft shield mount trench.

6. The turbine section of claim 4, further comprising a first axial load rail arranged on the first aft wall between the forward tip portion and the first aft wall, and a second axial load rail arranged on the second aft wall between the aft tip portion and the second aft wall, wherein the forward tip portion and the aft tip portion are configured to engage the first axial load rail and the second axial load rail, respectively, when the gases moving along the primary gas path exert a force on the forward turn-up and the aft turn-up, respectively.

7. The turbine section of claim 4, further comprising at least one forward pin extending through the first forward wall, the forward tip portion, and the first aft wall in the axial direction, at least one aft pin extending through the second forward wall, the aft tip portion, and the second aft wall in the axial direction, wherein the at least one forward pin and the at least one aft pin are configured to transfer aerodynamic loads from the forward turn-up and the aft turn-up to the forward shield mount and the aft shield mount, respectively, when the gases moving along the primary gas path exert a force on the forward turn-up and the aft turn-up, respectively.

8. The turbine section of claim 1, wherein the heat shield further includes a protrusion extending radially away from the outer platform towards the carrier segment, the protrusion surrounds at least a portion of an outer surface of the support spar that extends between the carrier segment and the outer platform so as to form a gap between an inner surface of the protrusion and the outer surface of the support spar.

9. The turbine section of claim 8, further comprising at least one of an axial load pad, a circumferential load pad, and at least one radial load pin, wherein:

the axial load pad is arranged on the carrier segment and extends radially inward towards the outer platform so as to be axially adjacent to the protrusion, the axial load pad configured to interact with an outer protrusion wall of the protrusion so as to transfer aerodynamic loads from the heat shield to the carrier segment when the gases moving along the primary gas path exert a force on the heat shield;

the circumferential load pad is arranged on the carrier segment and extends radially inward towards the outer platform so as to be circumferentially adjacent to the protrusion, the circumferential load pad configured to interact with the outer protrusion wall so as to transfer aerodynamic loads from the heat shield to the carrier segment when the gases moving along the primary gas path exert a force on the heat shield; and the at least one radial load pin extends through the protrusion into at least one wing of the carrier segment, the at least one wing arranged on the carrier segment and extending radially inward past a top portion of the protrusion.

10. The turbine section of claim 1, wherein the heat shield further includes an inner platform formed as one piece with the vane portion, the seal segment portion, and the forward and aft turn-ups.

11. The turbine section of claim 10, wherein the vane assembly includes a sealing retainer disposed on an inner radially end of the support spar opposite the main body of the carrier segment, and the sealing retainer is configured to engage with the inner platform in order to seal a radially inner end of the vane assembly.

12. A turbine section of a gas turbine engine, the turbine section comprising a carrier segment comprising metallic materials and extending partway around a central axis of the gas turbine engine, the carrier segment including a main body having a forward side, an aft side, at least one vane portion, and at least one turbine shroud portion located axially adjacent to the at least one vane portion, a vane assembly including at least one support spar comprising metallic materials, the at least one support spar coupled to a corresponding vane portion of the at least one vane portion of the main body and extending radially inward from the main body of the carrier segment toward the central axis, a turbine shroud assembly including at least one turbine shroud located axially adjacent to the at least one vane portion, the turbine shroud including a corresponding turbine shroud portion of the at least one turbine shroud portion of the main body, and a heat shield comprising ceramic matrix composite materials included as part of the vane assembly and the turbine shroud assembly, the heat shield formed as a one piece component that is shaped to include (i) at least one vane having an outer platform and an airfoil that protect a corresponding support spar of the at least one support spar of the vane assembly, (ii) at least one seal segment portion that protects a corresponding turbine shroud portion of the at least one turbine shroud portion of the main body so as to provide the vane assembly and the turbine shroud assembly without a gap between the outer platform of the vane assembly and the turbine shroud assembly, and (iii) a forward turn-up extending radially outward from a forward edge of the heat shield and an aft turn-up extending radially outward from an aft edge of the heat shield, the forward turn-up and the aft turn-up coupling the heat shield to the carrier segment.

13. The turbine section of claim 12, further comprising a forward shield mount arranged on a forward side of the main body,
an aft shield mount arranged on an aft side of the main body,
the forward turn-up is configured to couple to the forward shield mount, and
the aft turn-up is configured to couple to the aft shield mount.

14. The turbine section of claim 13, wherein the forward shield mount extends at least partway over a circumferential extent of the forward turn-up,
the aft shield mount extends at least partway over a circumferential extent of the aft turn-up,
the forward shield mount includes a first forward wall and a first aft wall defining a forward shield mount trench that at least partially surrounds a forward tip portion of the forward turn-up when the forward turn-up is coupled to the forward shield mount,
the aft shield mount includes a second forward wall and a second aft wall defining an aft shield mount trench that at least partially surrounds an aft tip portion of the aft turn-up when the aft turn-up is coupled to the aft shield mount,
a first width of the forward shield mount trench in an axial direction of the gas turbine engine is greater than a first thickness of the forward tip portion so as to form a first axial gap between the forward tip portion and the first aft wall, and
a second width of the aft shield mount trench in the axial direction is greater than a second thickness of the aft tip portion so as to form a second axial gap between the aft turn-up and the second aft wall.

15. The turbine section of claim 14, wherein a radial extent of the forward shield mount trench is greater than a radial extent of the forward tip portion so as to form a first radial gap between a top surface of the forward tip portion and a top wall of the forward shield mount trench, and
a radial extent of the aft shield mount trench is greater than a radial extent of the aft tip portion so as to form a second radial gap between a top surface of the aft tip portion and a top wall of the aft shield mount trench.

16. The turbine section of claim 14, further comprising a first axial load rail arranged on the first aft wall between the forward tip portion and the first aft wall, and
a second axial load rail arranged on the second aft wall between the aft tip portion and the second aft wall,
wherein the forward tip portion and the aft tip portion are configured to engage the first axial load rail and the second axial load rail, respectively, when the gases moving along the primary gas path exert an axial force on the forward turn-up and the aft turn-up, respectively.

17. The turbine section of claim 14, further comprising at least one forward pin extending through the first forward wall, the forward tip portion, and the first aft wall in the axial direction,
at least one aft pin extending through the second forward wall, the aft tip portion, and the second aft wall in the axial direction,
wherein the at least one forward pin and the at least one aft pin are configured to transfer aerodynamic loads from the forward turn-up and the aft turn-up to the forward shield mount and the aft shield mount, respectively, when the gases moving along the primary gas path exert at least one of a radial force and a circumferential force on the forward turn-up and the aft turn-up, respectively.

18. The turbine section of claim 12, wherein the heat shield further includes at least one protrusion extending radially away from a corresponding outer platform of a corresponding vane towards the carrier segment,
each protrusion of the at least one protrusion surrounds at least a portion of an outer surface of a corresponding support spar protected by the corresponding vane that extends between the carrier segment and the corresponding outer platform so as to form a gap between an inner surface of the protrusion and the outer surface of the corresponding support spar.

19. The turbine section of claim 18, further comprising at least one of an axial load pad, a circumferential load pad, and at least one radial load pin,
wherein:
the axial load pad is arranged on the carrier segment and extends radially inward towards the corresponding outer platform so as to be axially adjacent to the corresponding protrusion, the axial load pad configured to interact with an outer protrusion wall of the corresponding protrusion so as to transfer aerodynamic loads from the heat shield to the carrier segment when the gases moving along the primary gas path exert a force on the heat shield;
the circumferential load pad is arranged on the carrier segment and extends radially inward towards the corresponding outer platform so as to be circumferentially adjacent to the corresponding protrusion, the circumferential load pad configured to interact with the outer protrusion wall of the corresponding protrusion so as to transfer aerodynamic loads from the heat shield to the carrier segment when the gases moving along the primary gas path exert a force on the heat shield; and
the at least one radial load pin extends through the corresponding protrusion into a corresponding at least one wing of the carrier segment, the corresponding at least one wing arranged on the carrier segment and extending radially inward past a top portion of the corresponding protrusion.

20. A method comprising
providing a turbine case shaped to surround a central axis of a turbine section of a gas turbine engine,
providing a carrier segment comprising metallic materials and extending partway around the central axis, the carrier segment including a main body coupled to the case, a forward shield mount arranged along a forward side of the main body, and an aft shield mount arranged along an aft side of the main body,
providing a vane assembly including a support spar comprising metallic materials,
coupling the support spar to the main body of the carrier segment such that the support spar extends radially inward from the main body of the carrier segment toward the central axis,
providing a turbine wheel including a disk mounted for rotation about the central axis and a plurality of blades coupled to the periphery of the disk for rotation therewith about the central axis,
providing a turbine shroud located co-axially with and radially outward of the turbine wheel to block gases moving along a primary gas path from moving over the blades of the turbine wheel without interacting with the turbine blades, the turbine shroud including a turbine shroud portion of the carrier segment, forming a heat shield comprising ceramic matrix composite materials as a one piece component that is shaped to include (i) a vane portion having an outer platform and an airfoil that protect the support spar of the vane assembly, (ii) a seal segment portion that protects the turbine shroud portion of the carrier segment so as to provide the vane assembly and the turbine shroud without a gap between the outer platform of the vane assembly and the turbine shroud, and (iii) a forward turn-up extending radially outward from a forward edge of the outer platform and an aft turn-up extending radially outward from an aft edge of the seal segment portion, the heat shield included as part of the vane assembly and the turbine shroud, and coupling the forward turn-up and the aft turn-up of the heat shield to the carrier segment.

* * * * *